United States Patent

Jensen

[15] 3,701,217
[45] Oct. 31, 1972

[54] TOY VEHICLE CAB ASSEMBLY

[72] Inventor: Douglas S. Jensen, Mound, Minn.

[73] Assignee: Tonka Corporation, Mound, Minn.

[22] Filed: June 7, 1971

[21] Appl. No.: 150,583

[52] U.S. Cl. .................................................. 46/222
[51] Int. Cl. ............................................. A63h 17/26
[58] Field of Search .................. 46/17, 221, 223, 222

[56] References Cited

UNITED STATES PATENTS

| 3,553,887 | 1/1971 | Linstead | 46/17 |
| 1,956,342 | 4/1934 | Brubaker | 46/221 |

Primary Examiner—Louis G. Mancene
Assistant Examiner—J. Q. Lever
Attorney—Carlsen, Carlsen & Sturm

[57] ABSTRACT

A toy vehicle cab having an open front outer cab shell mounted on a vehicle chassis, a passenger compartment assembly comprising a window forming bubble of transparent material, a seat insert within the bubble, and a grill member locking the insert within the bubble so that said assembly may be inserted as a unit rearwardly into the shell through the open front thereof, and said grill member having latch means for automatically locking the assembly in the shell. The structure also provides for partial automatic locking of the cab shell to the chassis.

2 Claims, 7 Drawing Figures

PATENTED OCT 31 1972 3,701,217

INVENTOR.
DOUGLAS S. JENSEN

BY
Carlsen, Carlsen & Sturm
ATTORNEYS

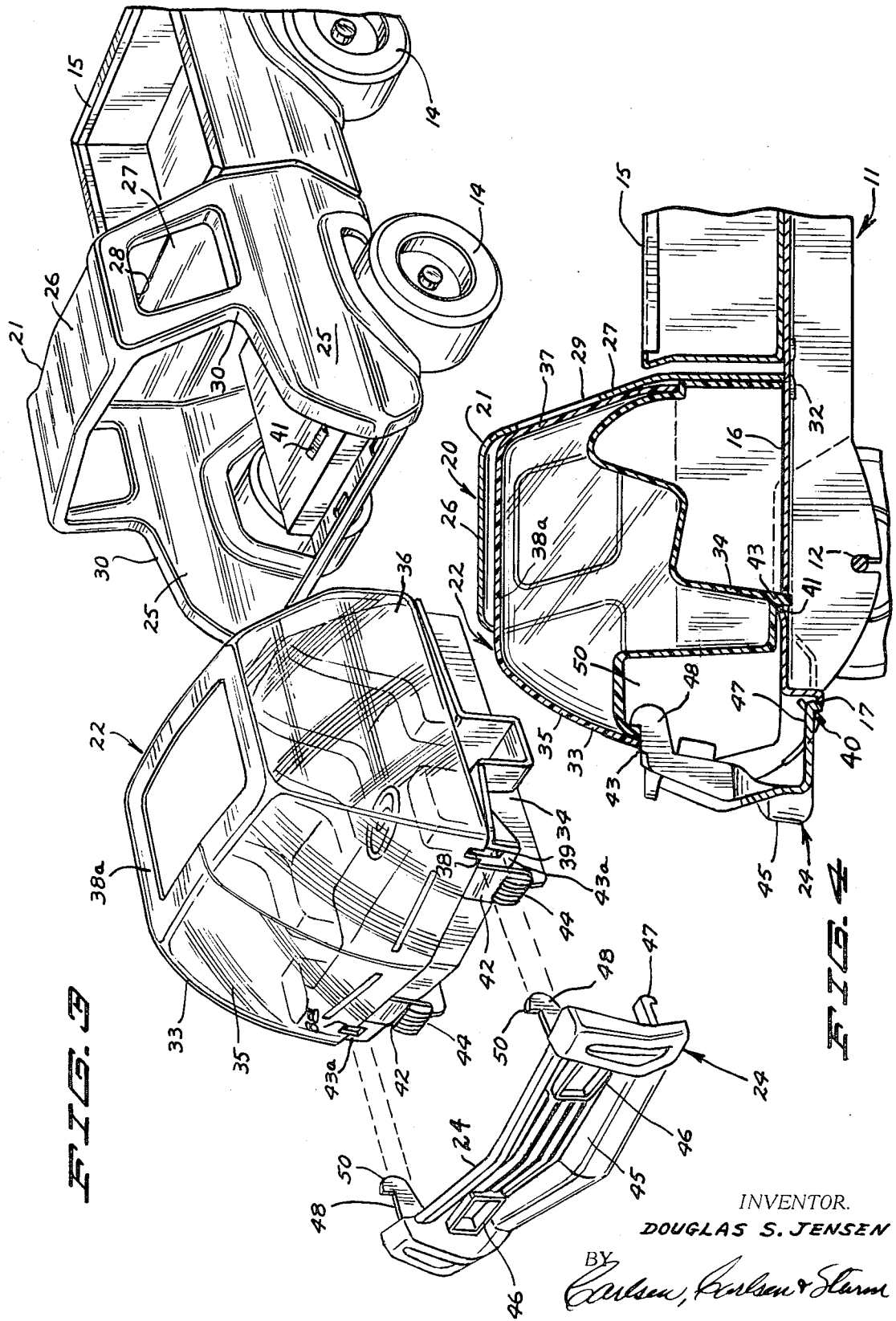

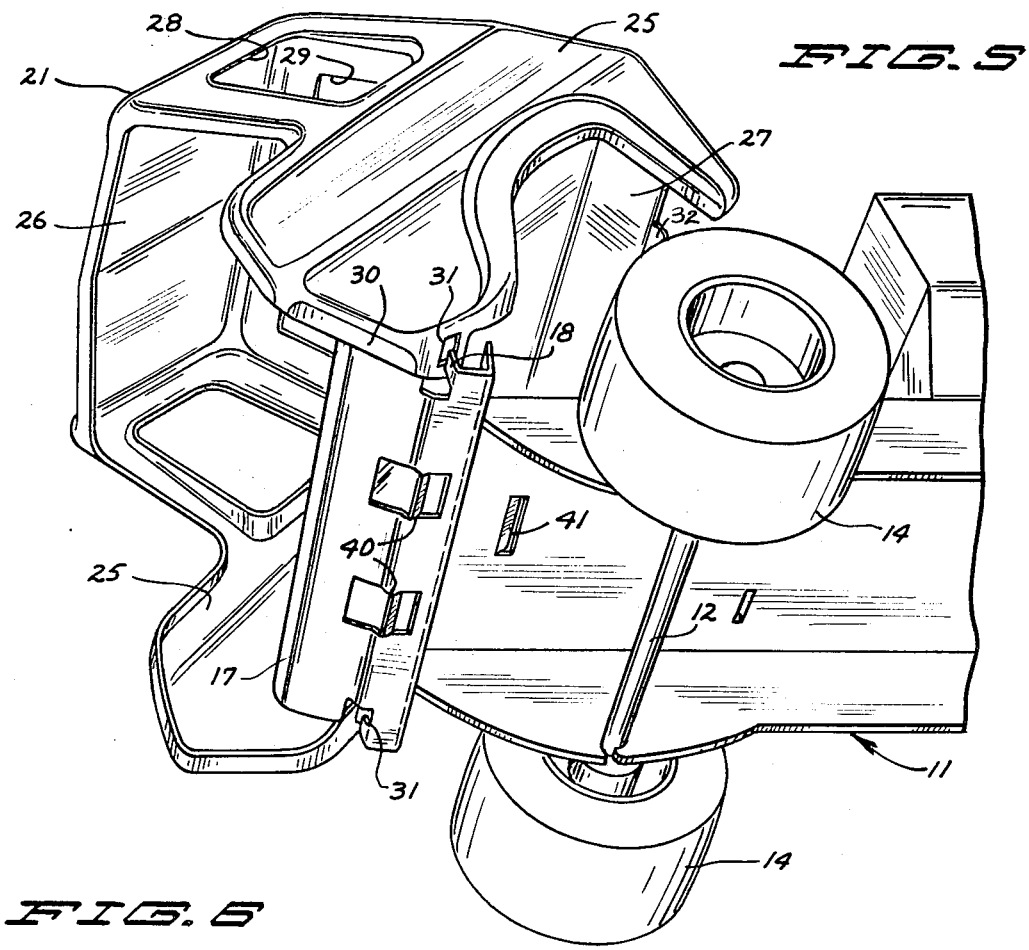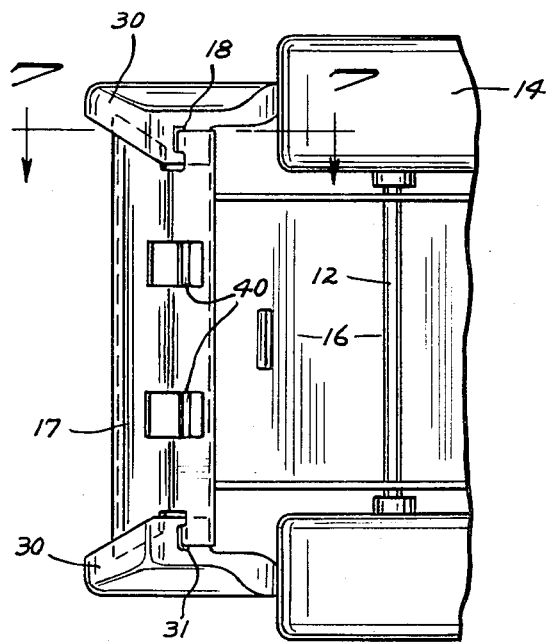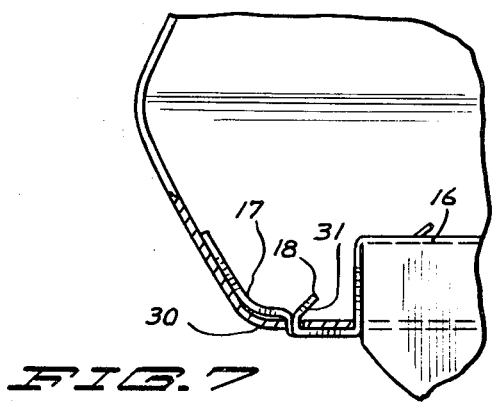

TOY VEHICLE CAB ASSEMBLY

BACKGROUND OF THE INVENTION

Most toy vehicles manufactured today, particularly of the truck variety, are provided with a cab having a bubble insert of plastic or other transparent material which is inserted into the vehicle cab to provide front, side and rear windows. Generally this construction is accomplished by inserting the bubble upwardly into the cab along with a base filler or seat insert simulating the cab interior and front grill and then bending over tabs projecting downwardly from the cab against the underside of the vehicle chassis to secure the cab to the chassis.

In other designs the bubble may be inserted rearwardly into the cab from the front thereof with a frontal grill member having rearwardly projecting tabs which project through the front of the cab and are then bent over to secure the bubble and grill in place.

In other known constructions, as well, where the cab and chassis are independently stamped, the bubble insert and filler must be assembled with the cab prior to final mounting of the cab on the chassis, prohibiting spray or dip painting of the cab and chassis in assembled condition.

Additionally, heretofore known cab and chassis assemblies have generally required bent tab connections between the two components at both the front and rear of the cab.

SUMMARY OF THE INVENTION

An object of the present invention is to provide a toy vehicle cab and chassis with a detachable interlocking means at their front ends which becomes secure when the rear end of the cab is secured to the chassis.

Another object of the invention is to provide a cab assembly for a toy vehicle wherein the cab shell may be permanently mounted on the vehicle chassis prior to insertion of the cab window forming bubble.

Still another object of the invention is to provide a cab assembly for a toy vehicle wherein the cab window forming bubble and grill member may be locked into the outer shell of the cab by self-locking means provided on the grill member.

Still another object of the invention is to provide a toy vehicle cab assembly wherein the cab windshield and headlights are formed from the same member of transparent material.

With these and other objects in view the invention broadly comprises the provision of transversely spaced hook means on the front end of the chassis adapted to engage in transversely spaced apertures on the front end of the cab to interlock the members together in this area without further riveting or metal bending manufacturing steps. It further comprises providing a frontal opening in the cab shell through which the window forming bubble may be inserted and a grill member having latch means for engagement with the chassis and bubble to secure the cab in assembled condition.

BRIEF DESCRIPTION OF THE DRAWINGS

In the drawings:

FIG. 3 is an exploded perspective view of the vehicle cab components in preassembly position.

FIG. 4 is a longitudinal vertical section through the vehicle cab taken on line 4—4 of FIG. 2.

FIG. 5 is a perspective view taken from the front underside of the vehicle during the assembly of the cab shell and the vehicle chassis.

FIG. 6 is an inverted plan view of the front portion of the vehicle with the cab shell mounted on the chassis but before assembly of the other cab components.

FIG. 7 is an enlarged fragmentary vertical section taken on line 7—7 of FIG. 6.

DESCRIPTION OF THE PREFERRED EMBODIMENT

Figure 1:
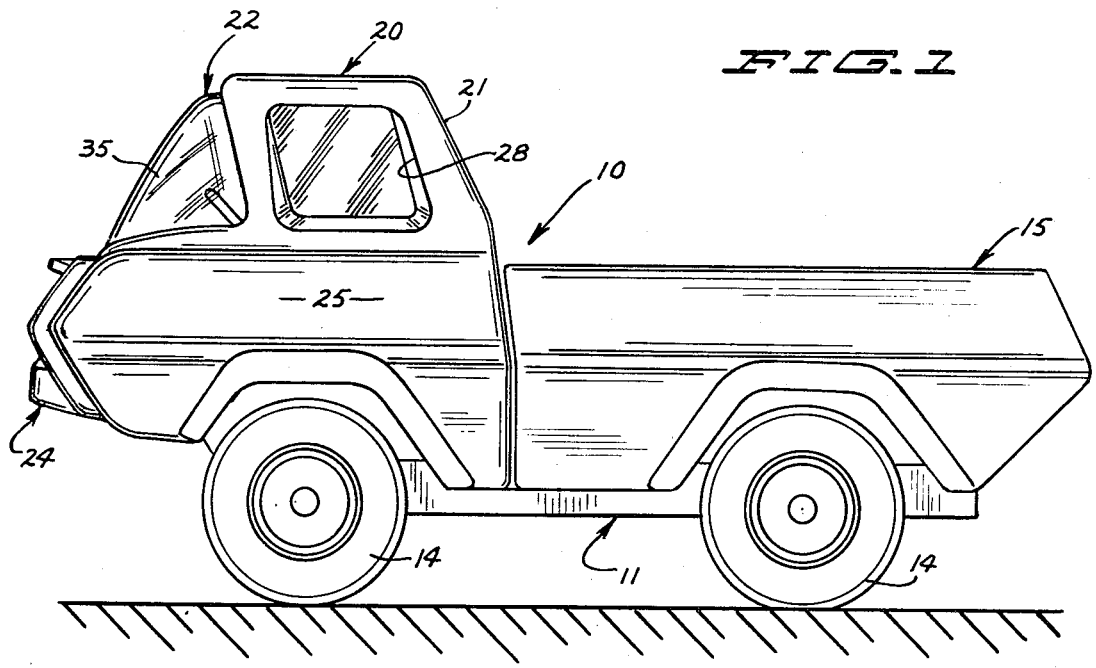
FIG. 1 is a side elevation of a toy vehicle in assembled condition embodying the present invention.
Figure 2:
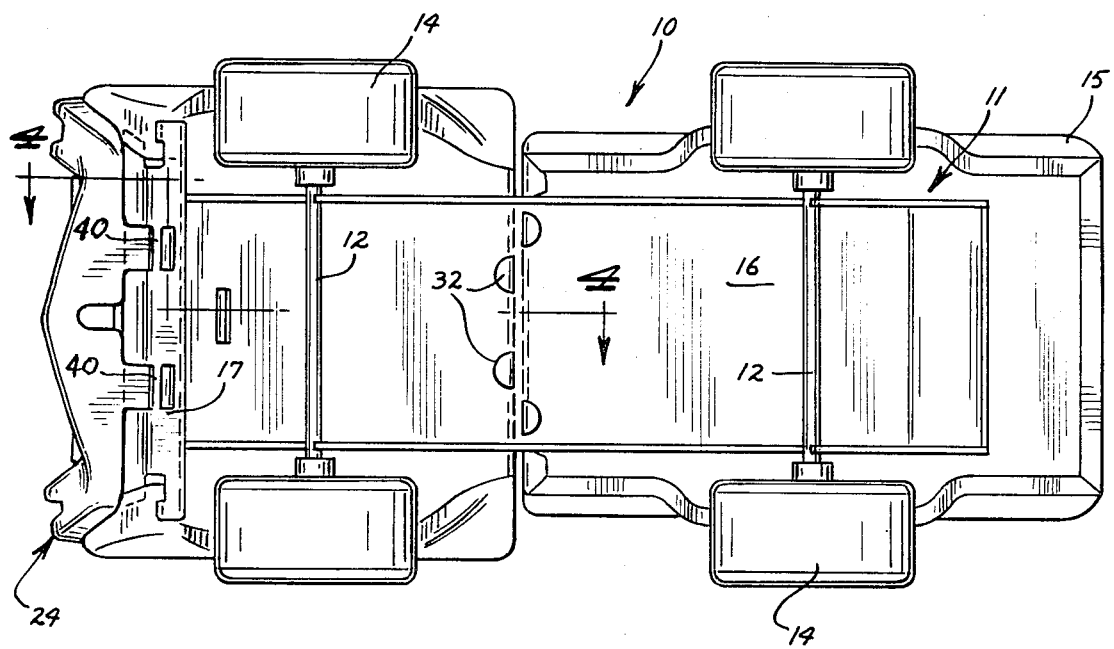
FIG. 2 is an inverted plan or bottom view of the vehicle.

Referring now more particularly to the drawings reference numerals will be used to denote like parts or structural features in the different views. The toy vehicle denoted generally at 10 comprises a chassis 11 supported on front and rear axles 12 which carry ground wheels 14. A truck box 15 is mounted on the rear portion of chassis 11.

Chassis 11 has a flat longitudinally extending horizontal bed 16 with a depressed apron portion 17 formed to extend across the front end thereof. Apron 17 has an upwardly opening trough-like configuration in cross section as can best be observed in FIGS. 4 and 7. Small upwardly projecting hooks 18 are formed at the ends of apron 17. Between the hooks 18 the apron 17 angles upwardly and forwardly to approximately the level of bed 16.

The truck cab assembly denoted generally by the numeral 20 comprises a cab shell 21, a bubble insert component 22 and a grill member 24. The cab shell has a pair of side walls 25 interconnected by a roof 26 and rear wall 27. Side walls 25 have window openings 28 and the rear wall 27 has a window opening 29. The entire front of shell 21 is open. The walls 25 have inwardly directed flanges 30 extending along the lower and front edges thereof and apertures 31 are provided in said flanges near the front lower corner of the shell. A pair of tabs 32 depend from the bottom edge of rear wall 27 and are so spaced as to project through slots in the bed 16 of chassis 11.

The cab shell 21 is assembled with the chassis in the manner shown in FIG. 5. The front portion of the shell is lowered onto the chassis portion 17 with apertures 31 being placed over hooks 18. The shell is then tilted rearwardly against the chassis with tabs 32 being inserted through the slots formed therein. When the tabs 32 are bent upwardly against the bed 16, the shell 21 is firmly and immovably attached to the chassis 11. Hooks 18 may also be bent downwardly against flanges 30.

The bubble insert component 22 comprises a downwardly opening box-like bubble housing 33 of transparent plastic material and a base 34 which fits within the lower portion of the housing 33 and simulates the seating, dashboard and other interior furnishings of the cab. Housing 33 has a front windshield wall 35, side walls 36, rear wall 37 and top 38a. Component 22 is of such size as to be insertable rearwardly into the cab shell 21 and fit snugly therein with walls 36 forming windows inside of the openings 28 and rear wall 37 forming a window inside of opening 29. Front wall 35 forms the vehicle windshield. Base member 34 is hollow and its side walls converge slightly in their upward extension so that when the base is inserted upwardly into the housing 33 it will fill the lower portion thereof. The front wall 35 of the housing 33 is provided along its lower edge with transversely spaced notches 38 which are respectively aligned with vertical slots 39 in the front wall 43a of base 34. Wall 35 also has a pair of transversely spaced tabs 42 depending from the lower edge thereof terminating in forward projections 44 which simulate headlights for the vehicle.

Apertures are provided in apron 17 which form a pair of transversely aligned rearwardly facing catches 40. There is also a transverse slot provided centrally in bed 16 forming an upwardly and rearwardly facing catch 41.

The grill member 24 is formed of rigid semiresilient material to lock the components of the assembly in place. Member 24 has its front wall 45 formed to simulate the grill and front bumper of the vehicle. A pair of transversely spaced openings 46 are provided in the wall 45 to receive the projections 44. A pair of latch tabs 47 extend rearwardly from the lower portion of wall 45. These tabs have downwardly projecting latch portions adapted to respectively hook over the catches 40, as shown in FIG. 4. Another pair of hook members 48 project rearwardly from the upper wall of member 24. Members 48 are aligned with slots 39 and have upwardly projecting teeth 50 which are insertable through slots 38 and 39.

In the assembly base 34 is first inserted upwardly into housing 33 as shown in FIG. 3. Grill member 24 is then attached to the component 22 by inserting hook members 48 into slots 38 and 39. This locks the units 24, 33 and 34 together with the projections 44 seated in openings 46 to prevent relative upward removal of housing 33. The entire component 22 is then moved rearwardly through the open front of shell 21 to the position shown in FIG. 4. This is a snug fit with flanges 30 and the front edge of roof 26 engaging against the side walls 36 and the top wall 38.

As the assembled insert component 22 is moved rearwardly into the shell 21, the latch tabs 47 will slide over and lock behind catches 40. At the same time a small flange 43 depending from base 34 will slide over and lock behind catch 41 locking the assembly 22 securely within shell 21 even if grill 24 should subsequently be broken.

Having now therefore fully illustrated and described the invention, what I claim to be new and desire to protect by United States Letters Patent is:

1. In a toy vehicle,
   a. a vehicle body having an integral cab shell with a frontal opening,
   b. a bubble insert component smaller than said frontal opening enabling the component to be moved rearwardly through the opening into the shell to form cab windows,
   c. the bubble insert component having a pair of transversely spaced forwardly opening slots in the front thereof,
   d. the body having rearwardly facing catch means, and
   e. a grille member extending across the front of the cab shell and having a pair of hook members and a latch tab extending rearwardly therefrom respectively through said slots and into engagement with said catch to lock the insert component in the shell.

2. In a toy vehicle,
   a. a vehicle body having an integral cab shell with a frontal opening,
   b. a bubble insert component smaller than said frontal opening enabling the component to be moved rearwardly through the opening into a snug position within the cab shell during assembly of the toy,
   c. a catch means on the body within the cab shell and facing rearwardly away from the opening, and
   d. a flange on the component adapted to move over and lock behind the catch means as the component is moved into position within the cab shell to prohibit forward withdrawal of the component from the cab.

* * * * *